United States Patent
Craik et al.

(10) Patent No.: US 10,228,988 B2
(45) Date of Patent: Mar. 12, 2019

(54) DETECTING ANOMALIES IN PROGRAM EXECUTION

(71) Applicant: International Business Machines Corporation, Armonk, NY (US)

(72) Inventors: Rachel E. Craik, North York (CA); Allan Kielstra, Ajax (CA); Raymond Mak, Thornhill (CA); Melanie Ullmer, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 14/932,467

(22) Filed: Nov. 4, 2015

(65) Prior Publication Data
US 2017/0123875 A1    May 4, 2017

(51) Int. Cl.
| | | |
|---|---|---|
| *G06F 21/00* | (2013.01) | |
| *G06F 11/07* | (2006.01) | |
| *G06F 21/12* | (2013.01) | |
| *G06F 21/50* | (2013.01) | |
| *G06F 21/55* | (2013.01) | |

(52) U.S. Cl.
CPC ...... *G06F 11/0706* (2013.01); *G06F 11/0754* (2013.01); *G06F 21/128* (2013.01); *G06F 21/50* (2013.01); *G06F 21/552* (2013.01); *G06F 2221/033* (2013.01)

(58) Field of Classification Search
CPC ........ G06F 21/128; G06F 21/44; G06F 21/50; G06F 21/55; G06F 21/552; G06F 21/554
See application file for complete search history.

(56) References Cited

U.S. PATENT DOCUMENTS

| | | | |
|---|---|---|---|
| 6,202,199 B1* | 3/2001 | Wygodny | G06F 11/3636 702/183 |
| 7,954,094 B2 | 5/2011 | Cascaval et al. | |
| 8,032,866 B1* | 10/2011 | Golender | G06F 11/366 717/128 |
| 9,021,448 B1 | 4/2015 | Gagliardi et al. | |
| 2002/0157008 A1* | 10/2002 | Radatti | G06F 21/563 713/188 |
| 2015/0006961 A1 | 1/2015 | Bourne et al. | |
| 2015/0026335 A1 | 1/2015 | Ladd et al. | |

OTHER PUBLICATIONS

Oliner et al., "Advances and Challenges in Log Analysis," Communications of the ACM, vol. 55, No. 2, Feb. 2012, pp. 55-61.

* cited by examiner

*Primary Examiner* — Edward Zee
(74) *Attorney, Agent, or Firm* — Shumaker & Sieffert, P.A.

(57) ABSTRACT

Techniques are described for detecting anomalous behavior in program execution. In one example, a method includes logging occurrence of one or more key events during execution of a program. Each key event has a corresponding key event data structure associated with the program, and logging includes storing records associated with the key events, wherein each record is based on the key event data structure associated with the key event. The method further includes analyzing the records to determine if a current pattern of key events associated with the program during execution matches an expected pattern of key events and generating a security alert if the current pattern of key events does not match the expected pattern of key events for the program.

16 Claims, 10 Drawing Sheets

```
struct Program_Event_T {
    char program_name[8];
    long time_stamp;          // time since the Epoch; timestamp when the event is logged
    enum ET event_type;       // et_startup=1, et_stoprun=2, et_open=3, et_close=4,
                              // et_write=5, et_read=6, et_consecutive_io=7, et_sort_merge=8,
                              // et_xml_gen=9, et_xml_parse=10, ...

unsigned int flag;        // bit flag: 0x1=recurrent (other bits are not used)
                              // see below for explanation of recurrent events char file_name[32];       // file name, space if not an I/O related event
    char file_name1[32];      // 2nd file name for et_consecutive_io, space int rec_len;              // 0 if not I/O or sort related event
    union Log_Info_U {
        long long rec_read_count;    // for et_read or sort related event
        long long rec_write_count;   // for et_sort_merge, this is the number of record sorted;
                                     // for et_write, this is the number of record written long long xml_gen_len;       // for xml event
        long long xml_parse_len;     // for xml event
        long long json_gen_len;      // for json event
        long long json_parse_len;    // for json event
        long long total_memory_used; // for logging the total of memory used; 0 if not et_stoprun event
    };

// fields used to track recurrent events
    long start_time;          // start time (cpu) of a group of recurrent events
    long end_time;            // end time (cpu) of a group of recurrent events
    long long log_count;      // number of times this event has occurred
    long delta_time;          // average time between successive occurrence
    long delta_threshold;     // tolerance of frequency variation (bandwidth)
};
```

FIG. 4

DETECTING ANOMALIES IN PROGRAM EXECUTION

TECHNICAL FIELD

This disclosure relates to computer security, and more particularly, to detecting anomalies in program execution.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Compiled programming languages such as COBOL are ubiquitous in enterprise software systems. Data safety is the upmost importance to financial institutions. Early detection of malicious intent could enable such an institution to take action and intercept further attacks on data integrity. Late detection could cost financial companies and their customers millions of dollars.

Unfortunately, programs written in compiled programming languages like COBOL can contain well-concealed malicious code compiled into the executable. Previously compiled programs written in compiled programming languages may also be maliciously modified to achieve certain effects unknown to the user. Malicious code is usually intended to either collect data or corrupt data. Typically, the author of such code would want their modified program to execute normally for some period of time before periodically performing an extraneous, malicious action (such as copying data in clear text to another area of memory or altering some data).

SUMMARY

In one aspect of the invention, a method includes logging occurrence of one or more key events during execution of a program, wherein each key event has a corresponding key event data structure associated with the program, and wherein logging includes storing records associated with the key events, wherein each record is based on the key event data structure associated with the key event; analyzing the records to determine if a current pattern of key events associated with the program during execution matches an expected pattern of key events; and generating a security alert if the current pattern of key events does not match the expected pattern of key events for the program.

In another aspect, a computer program product includes a computer-readable storage medium having program code embodied therewith. The program code is executable by a computing device to log occurrence of one or more key events during execution of a program, wherein each key event has a corresponding key event data structure associated with the program, wherein logging includes storing records associated with the key events, wherein each record is based on the key event data structure associated with the key event; analyze the records to determine if a current pattern of key events associated with the program during execution matches an expected pattern of key events; and generate, with the one or more processing devices, a security alert if the current pattern of key events does not match the expected pattern of key events for the program.

In another aspect, a computer system includes one or more processors, one or more computer-readable memories, and one or more computer-readable storage mediums. The computer system further includes program instructions, stored on at least one of the one or more storage mediums for execution by at least one of the one or more processors via at least one of the one or more memories, to log occurrence of one or more key events during execution of a program, wherein each key event has a corresponding key event data structure associated with the program, wherein logging includes storing records associated with the key events, wherein each record is based on the key event data structure associated with the key event; program instructions, stored on at least one of the one or more storage mediums for execution by at least one of the one or more processors via at least one of the one or more memories, to analyze the records to determine if a current pattern of key events associated with the program during execution matches an expected pattern of key events; and program instructions, stored on at least one of the one or more storage mediums for execution by at least one of the one or more processors via at least one of the one or more memories, to generate, with the one or more processing devices, a security alert if the current pattern of key events does not match the expected pattern of key events for the program.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 illustrates a key event logging structure that can be used in a COBOL production system to record the occurrence of key events, according to one aspect of this disclosure.

DETAILED DESCRIPTION

Current approaches to securing compiled program code rely on either preventing access to the code, or detecting anomalous behavior in the compiled program code. Current solutions for preventing access to compiled program code rely on access control, acting as a fence or a barrier of security at the user level. Once users have passed the guarded gate, i.e., via the security login, their activities are trusted at the transaction level. This leaves a security exposure in which a hacker, once successfully logged in, can then attack financial data.

Current approaches to detecting anomalous behavior in compiled program code rely on the use of analytics to analyze large sets of static data gathered over time to form a code signature.

Programs written in compiled programming languages like COBOL may contain malicious code compiled into the executable. In addition, previously compiled programs written in compiled programming languages may be maliciously modified to achieve certain effects unknown to the user. Typically, the author of such malicious code would want the program to execute normally for some period of time and periodically perform an extraneous, malicious action (such as copying data in clear text to another area of memory or altering some data). It can be difficult to detect anomalous program behavior in compiled program code.

If, however, a program that normally has 250,000 file reads and is using 20 MB of memory suddenly is performing 2 million file reads and is using 1 GB of memory, this should raise a red flag. In the past, static reviews (e.g., a code signature) might detect such an anomaly after the fact, but there has been no mechanism for reacting to a sudden change in program behavior. A system of this disclosure may, however, advantageously log certain types of computer operations, periodically review the log to detect changes in behavior and generate an alert in response to unexpected behavioral changes. Such an approach is described below.

The approach described below therefore operates as a second line of defense (behind the defense of access control), acting as an immune system at the program level to detect data corruption and illicit program behaviors. This approach allows earlier detection of malicious behavior, reacting to a sudden change in the behavior of repeated execution instances of program code, thus leading to earlier intervention by security personnel.

Figure 1:
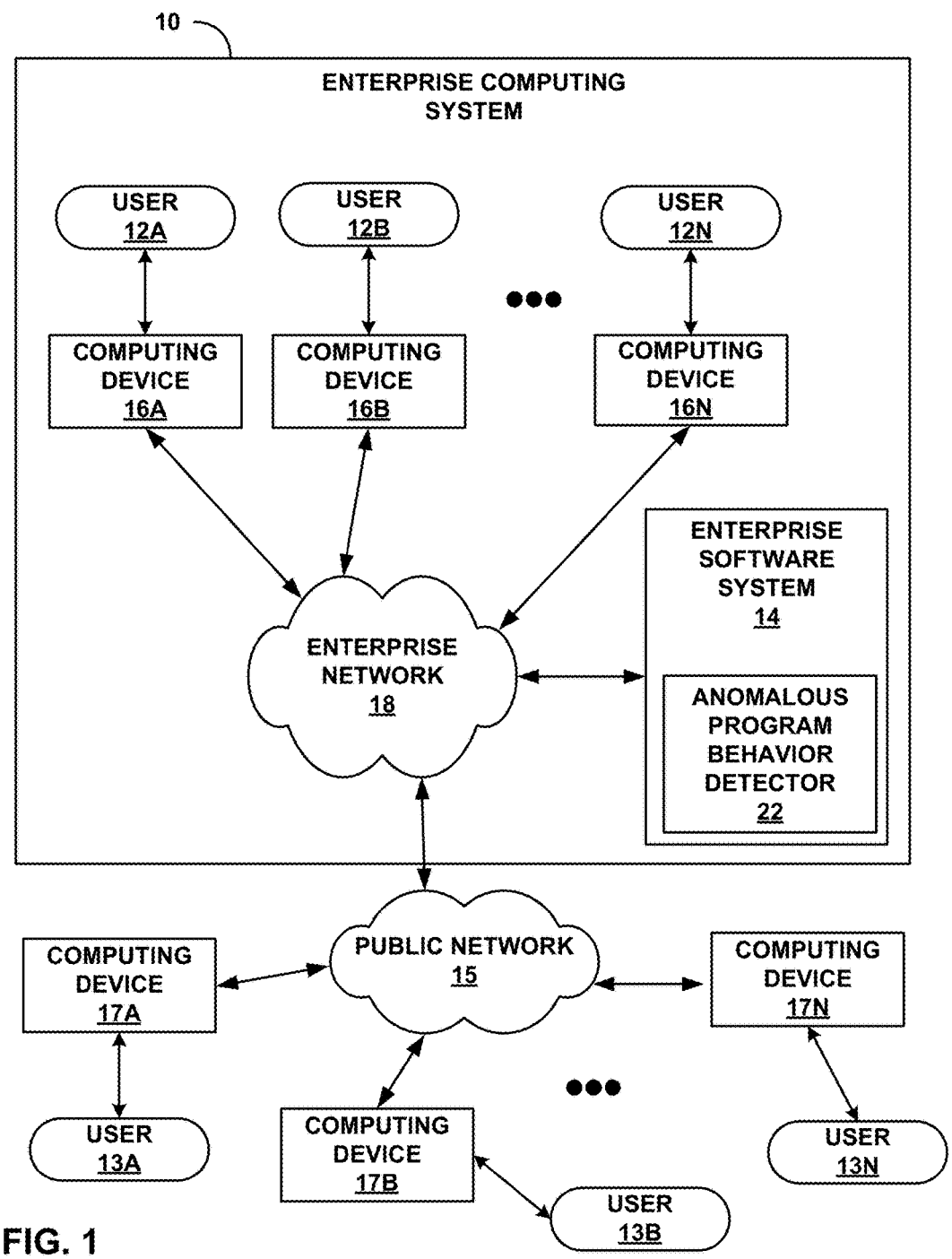
FIG. 1 shows a block diagram illustrating an example enterprise computing system that detects anomalous program behavior, according to one aspect of this disclosure.

FIG. 1 shows a block diagram illustrating an example enterprise computing system that detects anomalous program behavior, according to one aspect of this disclosure. FIG. 1 illustrates an example context in which the anomalous program behavior detectors 22 of this disclosure may be implemented and used. In the example of FIG. 1, an example enterprise computing system 10 supports as a plurality of users 12A-12N within an enterprise (collectively, "enterprise users 12" or "users 12"). Users 12 may interact with an enterprise software system 14 that includes an anomalous program behavior detector 22, as described further below. In the enterprise computing system 10 shown in FIG. 1, enterprise software system 14 is communicatively coupled to a number of client computing devices 16A-16N (collectively, "client computing devices 16" or "computing devices 16") by an enterprise network 18. Users 12 interact with their respective computing devices 16 to access enterprise software system 14. Users 12, computing devices 16, enterprise network 18, and enterprise software system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In some example approaches, enterprise software system 14 includes servers that may run programs written in compiled programming languages and may provide business analytics software. A user 12 may use a portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise computing system 10, as well as data from a variety of external sources that may be accessible over public network 15, including external client computing devices 17A-17N (collectively, "external client computing devices 17" or "computing devices 17") used by external users 13A-13N ("external users 13"). In some examples, enterprise computing system 10 may thus make anomalous program behavior detector 22 available to any of enterprise users 12 or external users 13.

In some of the example approaches of the system 10 of FIG. 1, users 12, 13 may use a variety of different types of computing devices 16, 17 to interact with enterprise software system 14 and access data visualization tools and other resources via enterprise network 18. For example, an enterprise user 12 may interact with enterprise software system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running programs providing, for example, a financial package or a business intelligence dashboard in a web browser, a dedicated mobile application, or other means for interacting with enterprise software system 14. An external user 13 may also access anomalous program behavior detector 22 via a smartphone, tablet computer, or similar device, using detector 22 to analyze behavior patterns in programs executing within system 10 and to detect changes in behavior that might indicate malicious behavior within the programs.

Enterprise network 18 and public network 15 may represent any communication networks, and may include a packet-based digital network such as a private enterprise intranet or a public network like the Internet. In this manner, computing system 10 can readily scale to suit large enterprises. Enterprise users 12 may directly access enterprise software system 14 via a local area network, or may remotely access enterprise software system 14 via a virtual private network, remote dial-up, or similar remote access communication mechanism.

Figure 2:
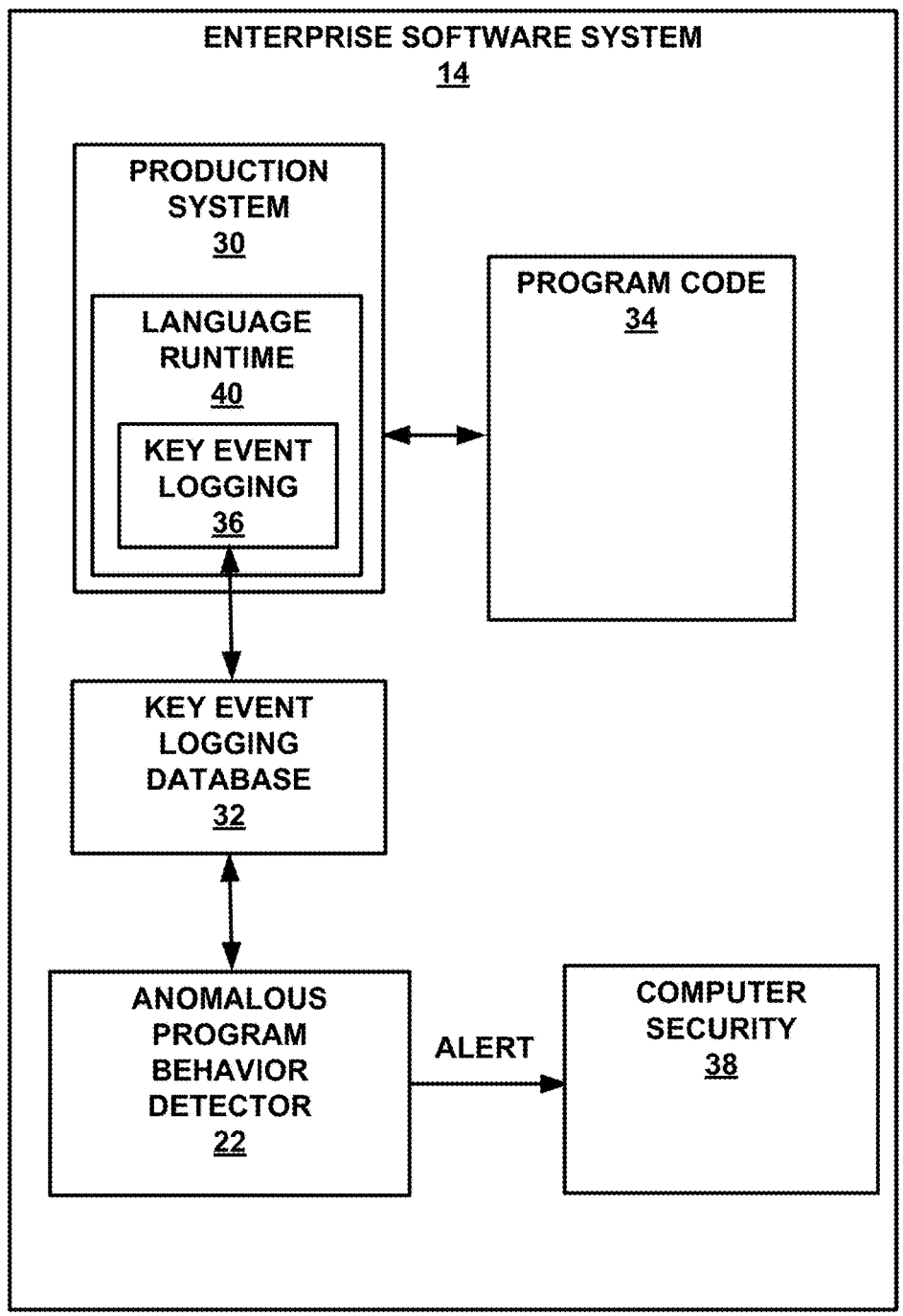
FIG. 2 illustrates a more detailed block diagram of anomalous behavior analysis of a program written in a compiled program language, according to one aspect of the present disclosure.

FIG. 2 illustrates a more detailed block diagram of anomalous behavior analysis of a program written in a compiled program language, according to one aspect of the present disclosure. In the example approach of FIG. 2, enterprise software system 14 includes a production system 30 executing program code 34 within language runtime 40 and logging key events in a key event logging database 32. An anomalous program behavior detector 22 retrieves records from database 32 and analyzes the records to determine normal and anomalous behaviors of the program. In one example approach, a key event logging structure 36 is used to capture data corresponding to the key events.

For example, a large part of the implementation of a compiled programming language like COBOL is achieved in the run time. The COBOL run time, for instance, implements file I/O and certain COBOL verbs (e.g., INSPECT.) It also does certain memory management on behalf of a COBOL program and is in a position to monitor overall memory usage. Repeated execution instances of (especially batch) COBOL programs tend to follow a common pattern. The relative times at which batch programs are executed also tend to follow a pattern. By defining, and capturing within a database, key COBOL run time events, the patterns of behavior to be expected can be determined, and variations in behavior can be detected.

In the example approach of FIG. 2, anomalous program behavior detector 22 retrieves records from database 32 and analyzes the records to determine normal and anomalous behaviors of the program. In response to detecting behavior that is outside the expected "normal" behavior, detector 22 generates an alert. In one such approach, the alert is received by a computer security program 38 executing in system 14 and used to generate an alarm. Such an approach allows earlier detection of malicious behavior, reacting to a sudden change in the behavior of repeated execution instances of program code, thus leading to earlier intervention by security personnel.

Figure 3:
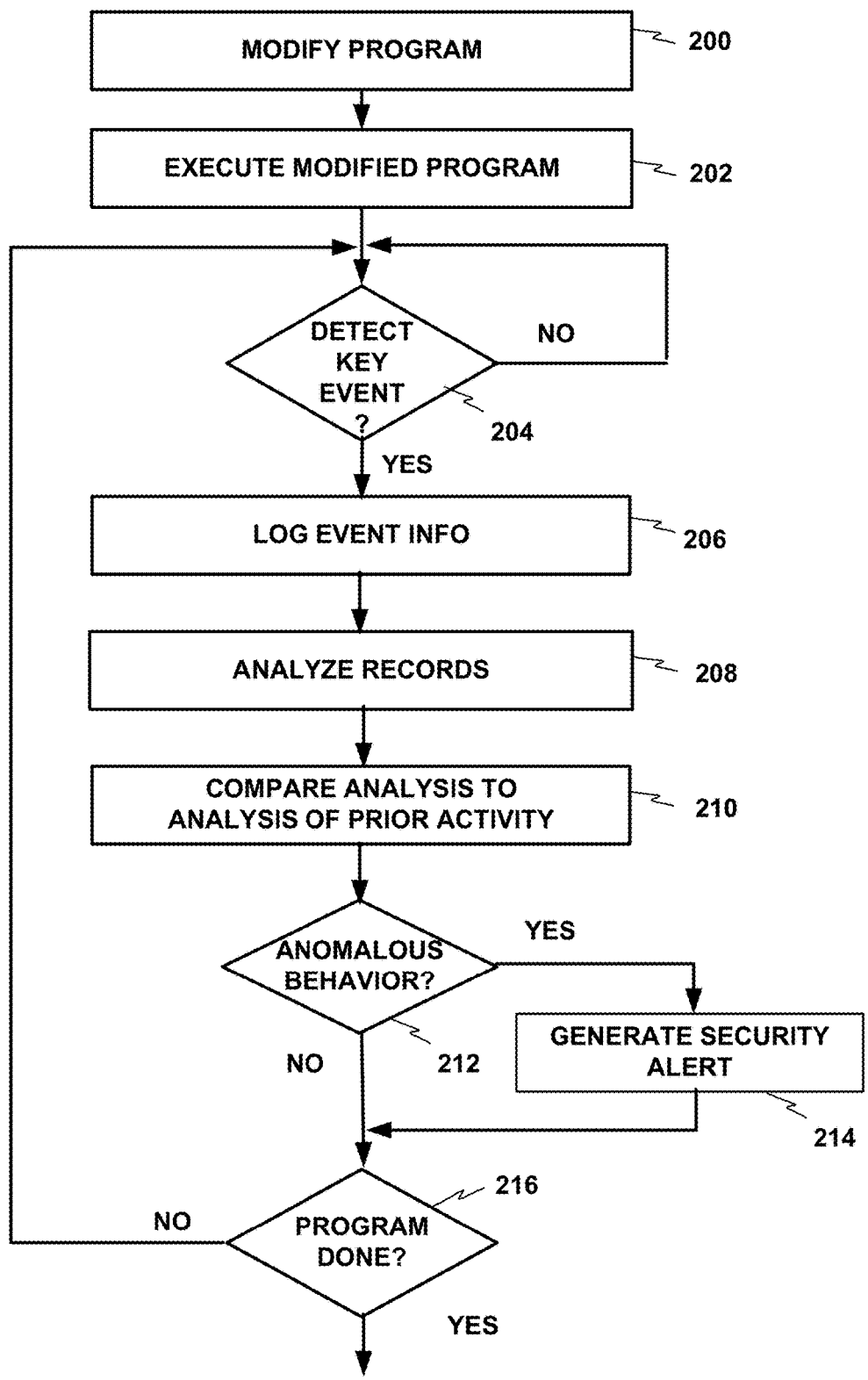
FIG. 3 illustrates a method of detecting anomalous behavior in a program, in an aspect of this disclosure.

FIG. 3 illustrates a method of detecting anomalous behavior in a program, in an aspect of this disclosure. A program including program code 34 is modified by, for example, a programmer with malicious intent (200). Production system 30 executes the modified program code 34 with support from language runtime 49 (202) and detects key events (204). In response to detecting a key event, production system 20 logs the key event in database 32 using, for example, key event logging structure 36 (206). Anomalous program behavior detector 22 retrieves records from database 32 and analyzes the records to determine a current pattern of key events (208). Anomalous program behavior detector 22 then compares the current pattern of key events against an expected pattern of key events for program code 34 (210) and determines whether the pattern of key events evidences anomalous behavior. (212) If anomalous behavior, anomalous program behavior detector 22 generates a security alert (214) and the program continues (216). If anomalous behavior is not detected at 212, the program continues at 216, and control moves to 204.

In one example approach, consider a z/OS production system 30 running any number of COBOL programs 34 within enterprise software system 14. In one example approach, a user 12, 13 interacting with production system 30 will construct and populate a persistent database 32 logging key events. In one such example approach, the event structure is laid out as shown in FIG. 4.

FIG. 4 illustrates a key event logging structure 36 that can be used in a COBOL production system 30 to record the occurrence of key events, according to one aspect of this disclosure. In the one example approach, a record is logged for one or more of the events listed below. In one example approach, the type of event is identified in key event logging structure 36 by the event_type field 42 shown in FIG. 4. In a COBOL implementation, the events to be logged may include one or more of:

The start of a COBOL run-unit—identified by the PROGRAM name

The opening of a file—identified by PROGRAM name and file name

Consecutive I/O events—identified by et_consecutive_io; this event is logged after a consecutive series of READ/WRITE are performed on a file, and the next I/O is performed on another file. In one example approach, this logging is optional and is controllable by a user specified runtime option (for performance consideration)

The closing of a file—identified by PROGRAM name, file name; also logged are the total number of READ/WRITE operations performed The reading of a file (et_read)—identified by PROGRAM name, file name The writing of a file (et_write)—identified by PROGRAM name, file name Recurrent events The number of records involved in a sort/merge operation The sizes of XML or json documents parsed and generated The stop time of a COBOL run-unit; also logged is amount of memory used by the process.

In one example approach, the tracking and logging of recurrent events is optional and is controlled by a runtime option. In one example approach, et_read and et_write are handled as recurrent events in the manner that will be discussed below. In one such example approach, recurrent events are logged by tracking start time of a group of recurrent events, end time of a group of recurrent events, the number of times the event has occurred, the average time between successive occurrences and the tolerance of frequency variation (bandwidth) as illustrated in the example shown in FIG. 4.

In some example approaches, anomalous program behavior detector 22 may be hosted among enterprise applications in enterprise software system 14, as in the example depicted in FIG. 2, or may be hosted elsewhere, including on a client computing device 16A/17A (which may be a client computing device 16A internal to enterprise computing system 10 or a client computing device 17A external to enterprise computing system 10 in different examples), or distributed among various computing resources in enterprise software system 14, in some examples. Anomalous program behavior detector 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices.

As described above and further below, anomalous program behavior detector 22 may be implemented in one or more computing devices, and may involve one or more applications or other software modules that may be executed on one or more processors.

The amount of data to be logged by a program and analyzed by anomalous program behavior detector 22 may be a balance of granularity and efficacy. Conceptually, for instance, production system 30 may log all activities of a running program. That is, production system 30 may keep a full execution trace, and anomalous program behavior detector 22 may analyze the trace afterwards to detect unusual happenings. In principle, the logging can be done at the most detailed (fine-grained) level if needed. For example, a user binary program can be instrumented to log the execution of every single machine instruction. We would have complete information on the execution history, but we would also incur a heavy penalty—the decrease in execution performance and the cost of maintaining huge volume of data.

On the other end of the spectrum, system 30 may log program start and end only. Performance would be minimally impacted. The data density would be low. But the usefulness of the data would be limited. The event types depicted in the previous section and illustrated in FIG. 3, therefore, represent one implementation of the idea of monitoring and analyzing program behavior, which strikes a balance between performance impact and data density. The idea can easily be modified to include and/or exclude selected events basing on the security requirements.

The above approach can be applied to other programming languages as well. In one example Java-based approach, events to be logged would tend to be more memory-based. In one such example approach, a Java program would be modified to log one or more of the following:

The number of objects created per unit time
The number of JNI calls per unit time
Each time a new object is spawned
The number low level routines that do reads and writes executed per unit time
The number of network connections opened per unit time.

In some example approaches, one or more of the logged events mentioned for the COBOL and Java examples above can be logged as recurrent events, instead of as individual logs. And one or more recurrent events can be logged as recurring events as well. Such an approach will be discussed next.

There are other ways to log key events in less detail while maintaining an adequate amount of information. For instance, if logging recurrent events, system 30 may, in some example approaches, capture information relating to when and how often the events occur, and anomalous program behavior detector 22 may look for changes in these parameters when looking for anomalous behavior.

For example, consider a loop performing I/O, reading from a transaction file, and writing to a master file. On one hand, we may want more information; we may want to log every read and write within the loop. But this can mean doubling the I/O activities of the program. This is usually not feasible given that a typical COBOL program is I/O bound and there is a time constraint imposed by the batch window. Instead, in one example approach, system 30 includes a method to gradually decrease the log data density of recurrent events while capturing sufficient information to represent the recurrence.

Figure 5:
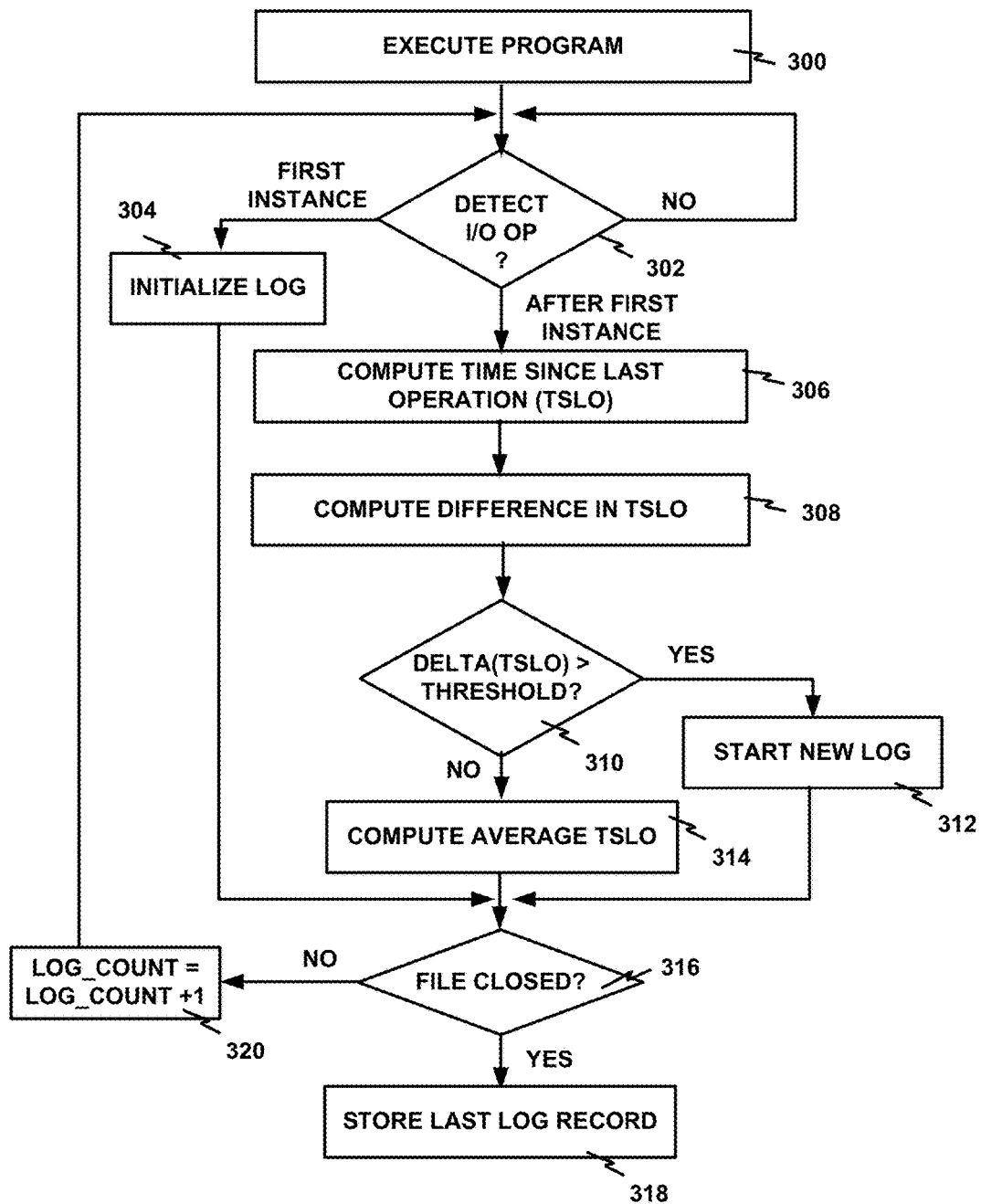
FIG. 5 illustrates a method for gradually decreasing log data density of recurrent events while capturing sufficient information to represent the recurrence, according to one aspect of this disclosure.

FIG. 5 illustrates a method for gradually decreasing log data density of recurrent events while capturing sufficient information to represent the recurrence, according to one aspect of this disclosure. The method illustrated in FIG. 5 is in the context of the handling of I/O events. The technique presented below, however, can be applied to any recurrent event. In one example approach, structure 36 stores the following information in memory as individual reads (or writes) are performed on a file. These fields are shown in structure 36 of FIG. 4:

```
Struct {
    char program_name[8];
    long time_stamp;
```

```
    ...
    long start_time; // start cpu time of this period
    long end_time; // end cpu time of this period
    long delta_time; // time since last operation
    long delta_threshold; // tolerance of frequency variation (bandwidth)
    long long log_count; // number of I/Os with this frequency
    long long rec_read_count;
    ...
};
```

In the above structure:

delta_time is a measure of the CPU time between a previous I/O operation and the current one. The reciprocal of delta_time is the frequency of a sequence of such I/Os. In this discussion, for convenience, we also refer to delta_time as the "frequency."

delta_threshold is the expected variation of delta_time (for a given sequence of I/O's). This expected variation is the error tolerance. We also refer to delta_threshold as the "bandwidth."

The approach for logging a read (or write) is as follows. As shown in FIG. 5, a program executes (300) and loops at 302 until an I/O operation is detected. In response to a file being opened during execution of a program, the operation is detected at 302 and control moves to 304, where system 30 initializes a new log record for this file. In one example approach, work1, work2 and delta_time_change are temporary variables. Current_time is the current wall clock time, current_cpu_time is the current CPU time from the system, and delta_threshold is a real number between 0 and 1.0 (1.0 means 100 percent). In some example approaches, it is a configurable parameter (set here to 0.15 as an example).

Control then moves to 316. In one example approach, initialization at 304 includes initializing the following fields as shown:
start_time=current_cpu_time
end_time=current_cpu_time
time_stamp=current_time
delta_threshold=0.15//can be other configurable values
delta_time=0
log_count=0
rec_read_count=0
rec_write_count=0

When processing subsequent I/O operations (read or write) at 302, production system 30 computes (at 306) the following:

```
work1 = current_cpu_time − end_time      // time since last operation
                                           (TSLO)
work2 = abs(delta_time − work1)           // |difference of TSLO|
delta_time_change = work2 / delta_time    // % difference (i.e.
                                            frequency change)
```

Production system 30 computes a difference between one of the parameters being measured and an average value of that parameter (308). Production system 30 checks to see if a parameter being measured is outside an expected range (310).

If the parameter being measured is more than a threshold amount different from the average parameter value, production system 30, with support from language runtime 40, writes the current log record for the parameter and initializes a new log record for the parameter (312). In one such approach, production system 30 executing program code 34 performs, for example, the following:

```
if (delta_time_change > delta_threshold) { // frequency change
exceeds threshold
    time_stamp = current_time
    flag = 0x1 // indicate recurrent mode logging
    output the current log record
    initialize a new log rec for this file, setting:
    start_time = current_cpu_time
    end_time = current_cpu_time
    delta_time = work1
    log_count = 0
}
```

In example approach, at 312, fields in the log record that are not listed above retain their values from the previous log record. Production system 30 then proceeds to 316. Otherwise, production system 30 adds the contribution of the parameter to the average parameter value (314) and proceeds to 316 as follows:

```
else {
    delta_time = (delta_time * log_count + work2) / (log_count + 1)
    log_count++
    rec_read_count++ // increase rec_write_count if it is write
    end_time = current_cpu_time
}
```

In response to the file being closed, production system 30 writes out the exiting (last) log record in memory (318). Otherwise, production system 30 goes to 320, increments log_count and moves to 302.

In one example approach, the event_type field is set to et_read or et_write (or the event type we are logging in recurrent mode). The flag field is set to 0x1 to indicate recurrent mode logging. (Note: This means that any event type can be logged in recurrent mode). The log record layout is the same, and event_type is set to indicate that event. In one such example approach, if the flag field's recurrent bit is 0, then it is a normal event logging. If it is 1, it is recurrent.

In the example shown in FIG. 5, we are effectively logging the frequency of this recurrent event. That is, (f=1/delta_time). The period of time for this frequency is from start_time to end_time. The number of hits is log_count. Our purpose is to reduce the impact on performance due to the extra I/O operations had we done fine-grained logging, and to limit the data volume. Note that if we set delta_threshold to an arbitrary high value, the logging would be equivalent to et_close. If, however, we set delta_threshold to −0.1, we will be logging every single I/O operation. The approach presented is, therefore, configurable (before program execution), and can cover the spectrum of data density requirements discussed in the previous section.

Note that, in the approach described in the context of FIG. 5, we are tracking in the frequency domain, instead of time. This would not be too interesting if there is only one file. But notice that we can do this for multiple files, with I/O operations interleaving each other within the same period of time. The frequency signature of all the files involved provides a good representation of the activities in the program.

Also, since we are logging frequency data instead of time, data analysis can be done on the frequency domain, for example using Fourier analysis. The logging is more efficient and discrepancies between different executions of the same program can be detected easily.

Also, in the example shown in FIG. 5, we are doing some portion of the computations shown in (306) through (314) for every I/O operation. Since we are measuring frequency, we can, instead, do these computations for every n I/O's instead of every time (e.g., n=5). Depending on the application, this might be sufficient. In one example approach, we can also use this approach if the CPU time is not fine-grained enough for the event type in question. (In this regard, I/O should normally be ok).

Figure 6:
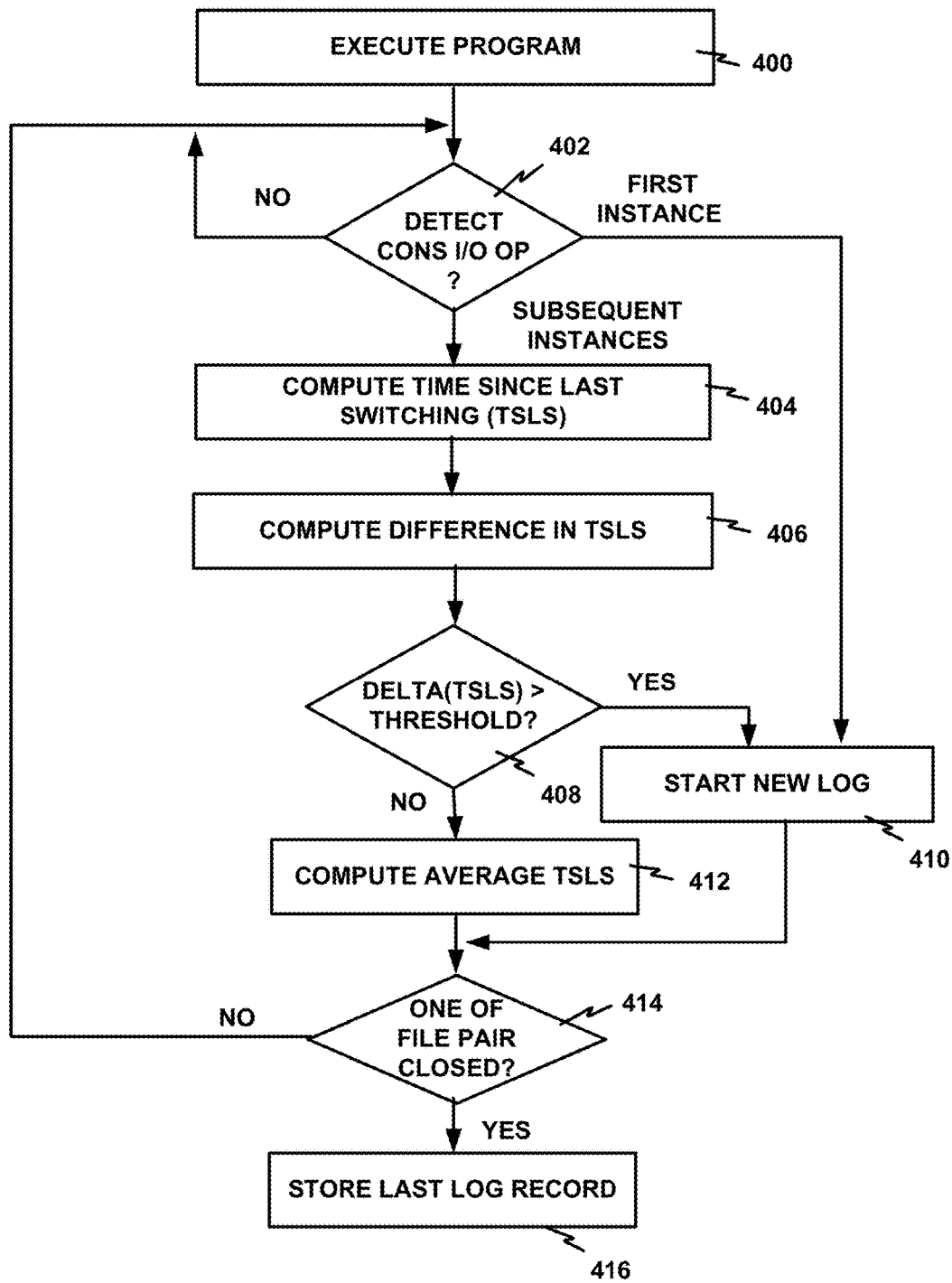
FIG. 6 illustrates a method of logging a recurrent event centered on a consecutive series of I/O operations, according to one aspect of this disclosure.

FIG. 6 illustrates a method of logging a recurrent event centered on a consecutive series of I/O operations, according to one aspect of this disclosure. In the example of FIG. 6, we want to log a single recurrent event in the situation where a consecutive series of I/O operations are performed on a file, and the next I/O is performed on another file. It should be apparent that, in some example approaches, the writing of an et_consecutive_io log record can itself be a recurrent event.

In one example approach, consider a loop which copies records from an input file to output. For each pass through the loop, a read operation is done from the input file, and a write operation is done to the output file. Because file switching happens between every I/O operation, system 30 logs an et_consecutive_io record for every I/O. We can reduce the data volume by using the technique described above for FIG. 5, and log the frequency of file switching, instead of the file switch itself. For a read-and-write copy loop, logging of this recurrent event can be reduced.

In one example approach, the algorithm for processing et_consecutive_io is as follows. Work1, work2 and delta_time_change are temporary variables. Current_time is the wall clock and current_cpu_time is the current CPU time from the system. Delta_threshold is a real number between 0 and 1.0. (1.0 means 100 percent). In some example approaches, the value of delta_threshold is a configurable parameter (set here to 0.15 as an example).

In the example approach shown in FIG. 6, production system 30 executes a program at 400 and performs a check at 402 for a file switching operation. When a file switching first happens to a particular from/to file pair at 402, production system 30 initializes a new log record is initialized for the file pair (410). In one such example approach, system 30 sets the follow fields at 410, start_time=current_cpu_time
   end_time=current_cpu_time
   delta_threshold=0.15//can be other user configurable values
   delta_time=0
   log_count=0
   rec_read_count=0
   rec_write_count=0
   file_name=from-file name of the switch
   file_name1=to-file name of the switch In response to detecting a subsequent file switching at 402, production system 30 moves to 404. The file pair is, in this instance, already being tracked in memory. Production system 30 calculates a time since last switching (404) and a difference between the current TSLS and an average TSLS (406).

work1=current_cpu_time−end_time//time since last switching(TSLS)

work2=abs(delta_time−work1)//difference of TSLS (abs returns absolute value)

delta_time_change=work2/delta_time//percentage difference(i.e. frequency change)

Production system 30 determines if a parameter being measured is outside an expected range (408) using, for example, the following:

```
if (delta_time_change > delta_threshold) { // frequency change
exceeds threshold
    time_stamp = current_time
    output the current log record
    initialize a new log rec for this file, setting
    start_time = current_cpu_time
    end_time = current_cpu_time
    delta_time = work1
    log_count = 0
}
```

In one example approach, other fields retain their values from the previous log record. Control moves to 414. Otherwise, if a parameter being measured at 408 is within an expected range, production system 30 adds the contribution of the parameter to the average parameter value (412) and proceeds to 414 as follows:

```
else {
delta_time = (delta_time * log_count + work2) / (log_count + 1) //
running avg
log_count++
rec_read_count++
end_time = current_cpu_time
}
```

Production system 30 determines at 414 if either the from- or to-file is closed. If not, control moves to 402 and checks for file switching operations continue. If, however, either the from- or to-file is closed, production system 30 writes out the exiting (last) log record in memory at 416, before, in some approaches, returning to 402.

Figure 7:
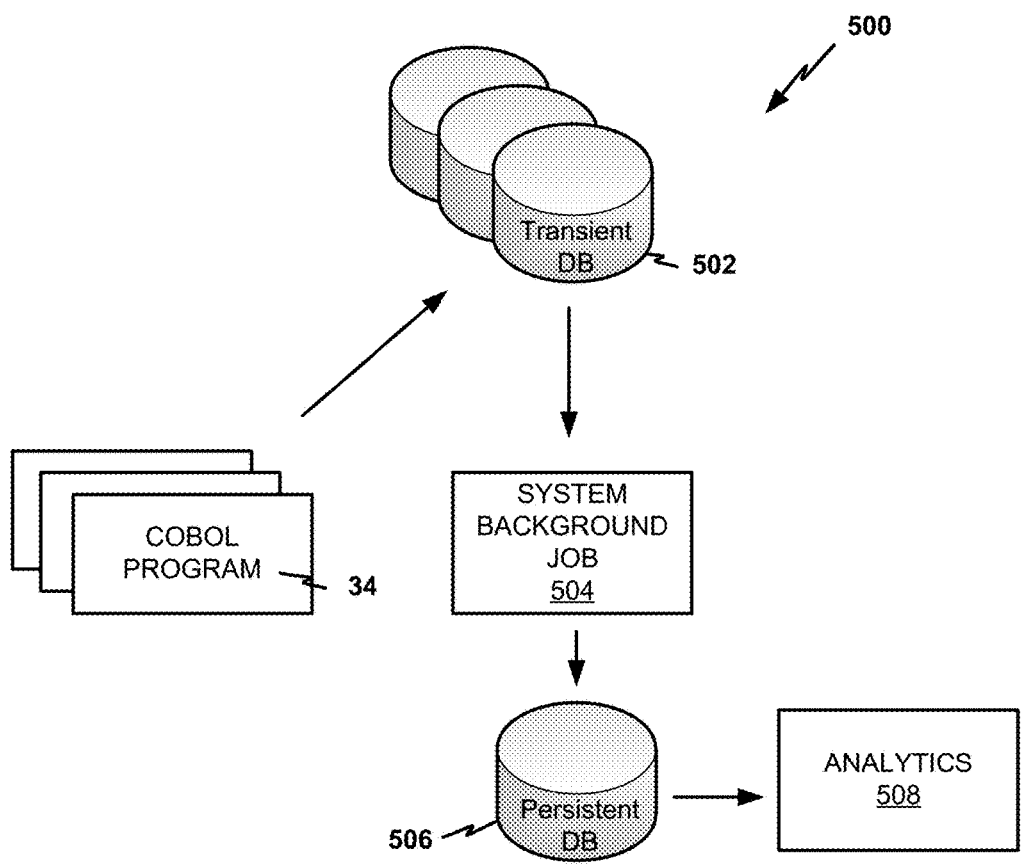
FIG. 7 illustrates a block diagram of a system for detecting and analyzing anomalous behavior in computer programs, according to one aspect of the present disclosure.

A production system 30 can detect anomalous behavior detection outside the enterprise computing system, as well as off-line. FIG. 7 illustrates a block diagram of a system for detecting and analyzing anomalous behavior in computer programs, according to one aspect of the present disclosure. In the example approach of FIG. 7, the data for a given execution instance of a program will initially be stored in a separate, transient database 502. A persistently running service 504 executing on a computing system 500 merges each of these transient databases into a persistent database 506 (thus relieving the COBOL run time of the burden of concurrently updating a persistent database). The data stored in persistent database 506 is used by analytic programs 508 to detect anomalies. In response to a pattern of execution on a given machine (such as computing system 500) having been established, in some example approaches analytic programs 508 look for events such as:

Programs being executed in a very different sequence
Differences in concurrency of program execution
Different numbers of files being written
Differences in memory usage and memory sharing
More data being exported by more file writes or more XML (or JSON) generation Dramatic differences in these sorts of metrics could indicate a dormant Trojan horse is now active (it could also indicate the presence of a malicious machine operator).

Anomalous behavior detection can also be done off-line, instead of at the same time the program is running In one example approach, analytics program 508 periodically checks persistent database 506 to see if any new key logging records have been filed. In one example approach, analytics program 508 accesses the persistent database 506 after the program terminates. Malicious intent can still be caught.

Figure 8:
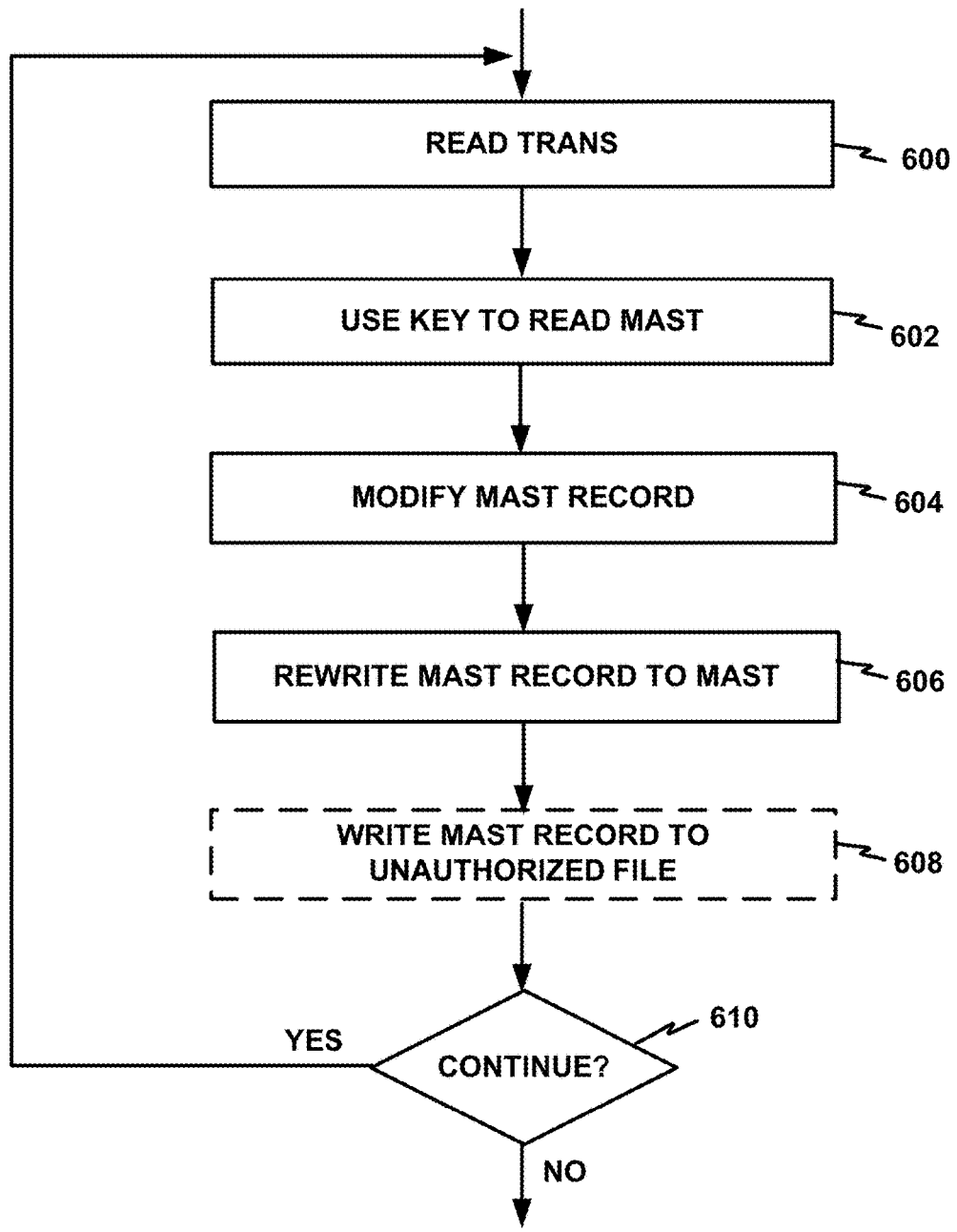
FIG. 8 illustrates an example approach for detecting malicious code, according to one aspect of the present disclosure.

FIG. 8 illustrates an example approach for detecting malicious code, according to one aspect of the present disclosure. In the example approach shown in FIG. 8, a production system 30 or a computing system 500 executes an update loop in which system 30, 500 reads an input transaction file, TRANS (600). System 30, 500 then uses a key to read a record from a Virtual Storage Access Method (VSAM) master file, MAST (602). System 30, 500 modifies the master file record (604) and writes the record back to the master file using the key (606). When done, the update loop is exited (610); otherwise, control returns to 600.

In the example shown in FIG. 8, malicious code 608 (shown as a dashed box) indicates a part of the program code that was not there initially when the program was first implemented and went into production. It was inserted later by a programmer or other individual with malicious intent. This could be an in-house maintenance programmer, a third-party contractor, or an unauthorized person who logged in remotely from outside of the company, gaining backdoor access into the system (first line of dense broken).

Before malicious code 608 was inserted, this program had been running for a while. Execution statistics had been collected using the methods described above. In particular, the reading of TRANS triggered an et_read event for TRANS file, which was logged using the recurrent mode described in the context of FIG. 5 above. Since the frequency of this read operation was constant (within a tolerance, assuming regularity of the loop), the recurrent mode resulted in one log record (with a suitable setting in delta_threshold).

After, however, malicious code 608 was inserted into the program code, adding a MAST write to an unauthorized file, the frequency of the TRANS read operation was changed. The et_read log record now has a different delta_time. Since the persistent database contained complete execution history of this program, this anomaly can easily be detected.

Note that, in one example approach, we measure frequency using CPU time, not wall clock time. But there is still a natural variation of the frequency. The expected bandwidth of this variation in frequency is what is constrained by delta_threshold. We can set a high threshold; this would result in a single log record as mentioned above, but would also make the collected data less sensitive to change. We can tune delta_threshold to a value touching the expected bandwidth. This would result in a set of et_read log records with a certain distribution profile (this is because individual read time can go above the threshold caused by variation). This set can still be small; and a change in its distribution profile can be detected easily by an analytics engine. In one example approach, delta_threshold is selected to provide expected number N separate et_read log records.

Suppose malicious code 608 goes one step further. Instead of copying every master record modified by an update run, it copies a record every 10 records, with the intention of causing less impact on the update loop and making the data stealing not as obvious. However, the read operations now change frequency periodically, and large number of et_reads will be logged due to the changes in frequency. The anomaly is even more obvious.

What has been described is a system and method for detecting anomalous behavior in program code executing on a computer. As noted above, programs written in compiled programming languages like COBOL may contain malicious code compiled into the executable. In addition, previously compiled programs written in compiled programming languages may be maliciously modified to achieve certain effects unknown to the user. It can be difficult to detect anomalous program behavior in compiled program code.

The approaches described above operate as a second line of defense behind access control, acting as an immune system at the program level to detect data corruption and illicit program behaviors. These approaches allows earlier detection of malicious behavior, reacting to a sudden change in the behavior of repeated execution instances of program code and thus leading to earlier intervention by security personnel.

Figure 9:
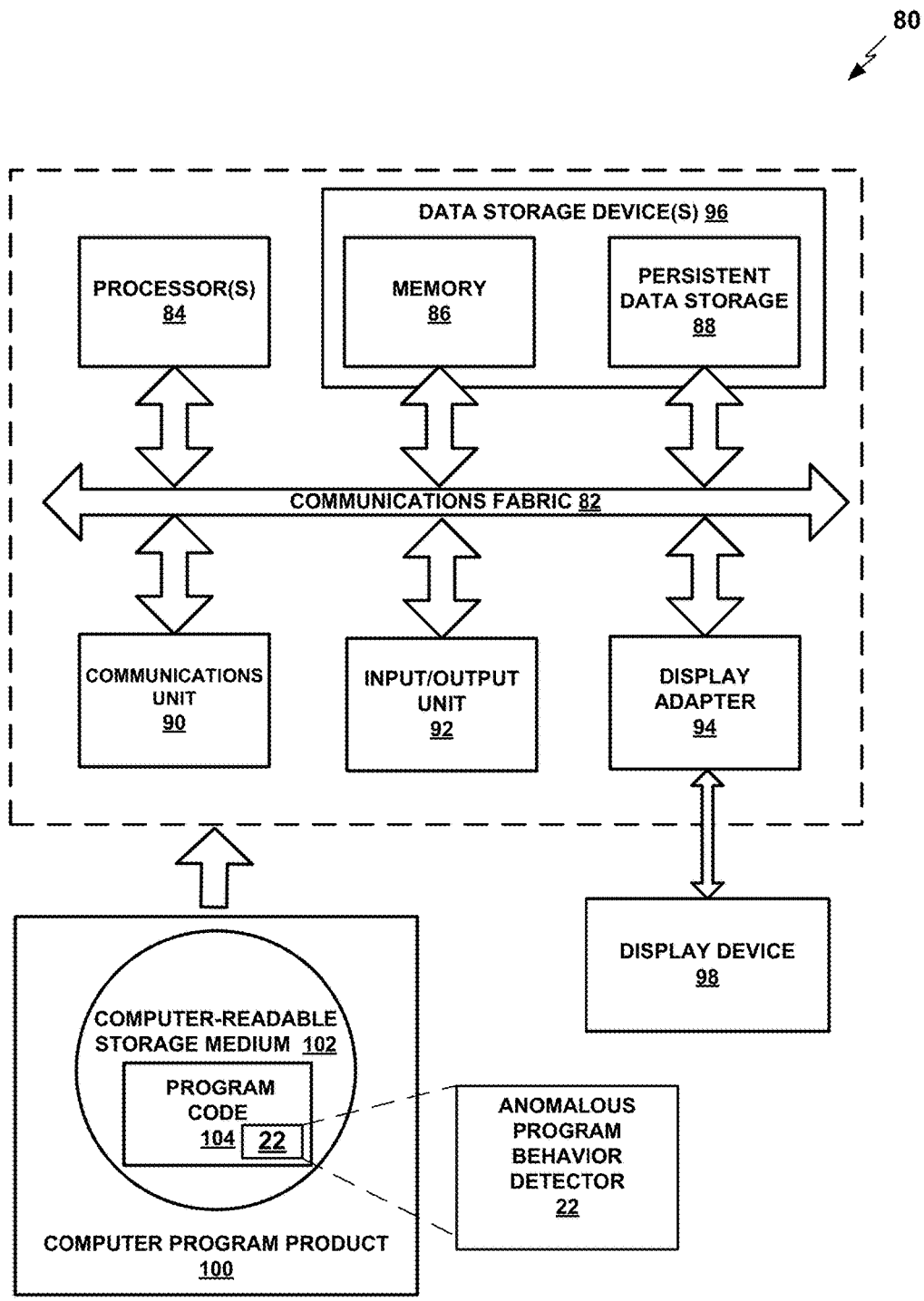
FIG. 9 is a block diagram of a computing device that may be used to implement a natural language query management system, in one aspect of this disclosure.

FIG. 9 is a block diagram of a computing device 80 that may be used to implement an anomalous program detection system having a production system 30, a key logging database 32 and an anomalous program behavior detector 22, in one aspect of this disclosure. Computing device 80 may be a server such the server 14 depicted in FIGS. 1 and 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind Other implementations of a computing device 80 may include a computer having capabilities or formats other than or beyond those described herein.

In the illustrative example of FIG. 9, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for anomalous program behavior detector 22, as described in greater detail above. This program code may be stored on memory 86, persistent data storage 88, or elsewhere in computing device 80. This program code may also take the form of program code 104 stored on computer-readable storage medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, enroute from its original source medium to computing device 80.

Figure 10:
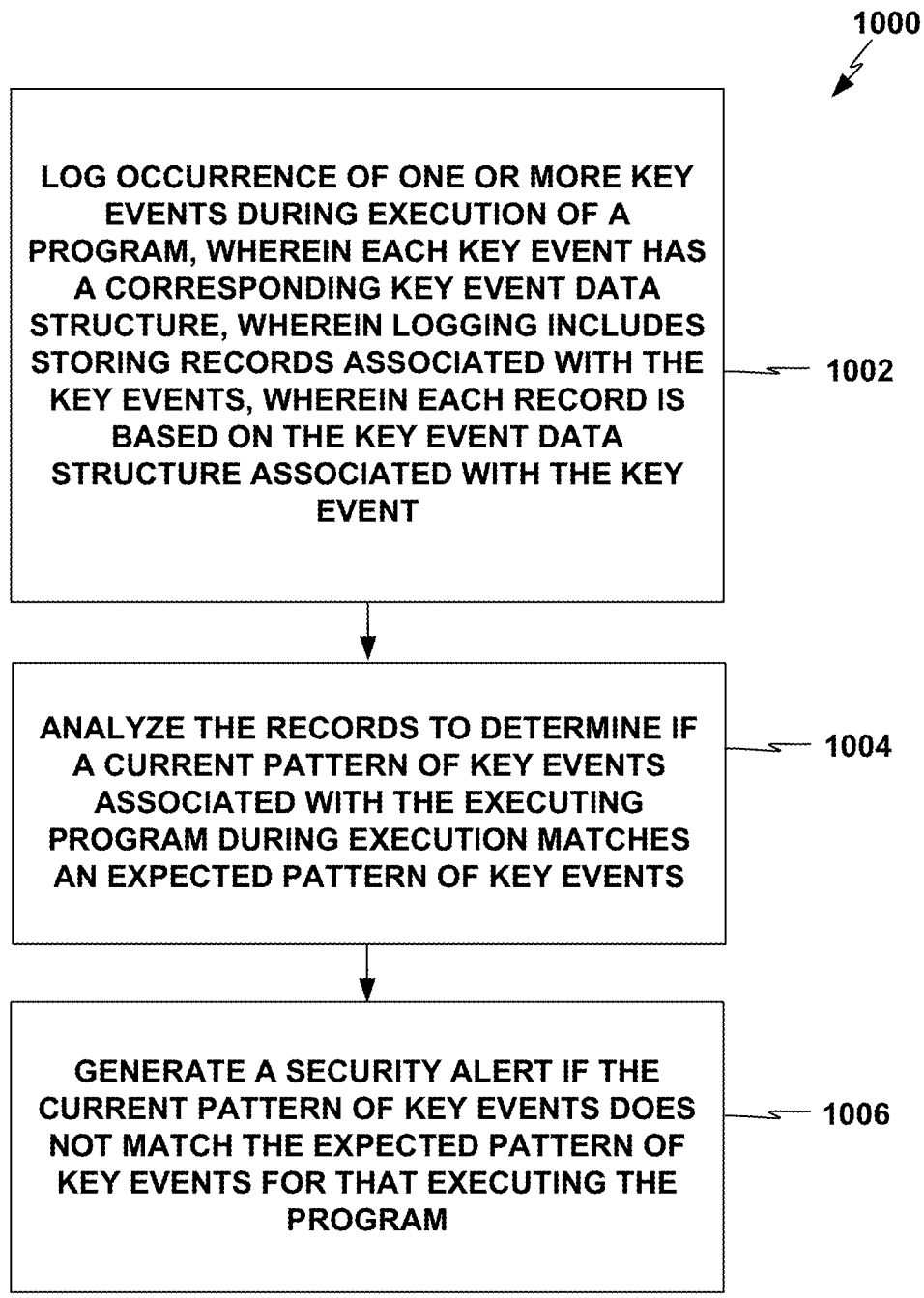
FIG. 10 depicts a flowchart of an example process that an anomalous program behavior detector, executing on one or more computing devices (e.g., servers, computers, processors, etc.), may perform, in one aspect of this disclosure.

FIG. 10 depicts a flowchart of an example process 1000 that anomalous program behavior detector 22, executing on one or more computing devices (e.g., servers, computers, processors, etc.), may perform, in one aspect of this disclosure. Process 1000 may include logging occurrence of one or more key events during execution of a program, wherein each key event has a corresponding key event data structure associated with the program, wherein logging includes storing records associated with the key events, wherein each record is based on the key event data structure associated with the key event (1002). Process 1000 may further include analyzing the records to determine if a current pattern of key events associated with the program during execution matches an expected pattern of key events (1004). Process 1000 may further include generating a security alert if the current pattern of key events does not match the expected pattern of key events for the program (1006). Various implementations of process 1000 may also include any of the processes described above with reference to FIGS. 1 through 9. While various examples are described above with reference to COBOL, Java, and z/OS, a variety of implementations of this disclosure may operate on any programming language, environment, runtime, or operating system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
  logging, with one or more processing devices, key events that occur during execution of a program, wherein each key event has a corresponding key event type and a corresponding key event data structure, wherein logging includes storing records associated with the key events, and wherein each record includes the corresponding key event type and is based on the key event data structure associated with the key event;

analyzing the records, with the one or more processing devices, to determine if a current pattern of key events associated with the program during execution matches an expected pattern of key events for the program; and generating, with the one or more processing devices, a security alert if the current pattern of key events does not match the expected pattern of key events for the program, wherein logging further includes monitoring recurrent events; and wherein monitoring recurrent events includes:
   determining when a file is opened;
   initializing a first log record for logging one or more operations associated with the file; and
   logging the operations associated with the file, wherein logging the operations associated with the file includes determining if the operations associated with the file occurred within an expected amount of time, wherein the expected amount of time is a function of a frequency and a delta threshold for the operations within the file.

2. The method of claim 1, further comprising designating key events to log.

3. The method of claim 1, wherein logging includes selecting key events from a group of key events associated with a COBOL program.

4. The method of claim 1, wherein logging includes selecting key events from a group of key events associated with a Java program.

5. The method of claim 1, wherein the program includes a first executing program and a second executing program, and wherein analyzing the records includes:
   determining, with one or more processing devices and based on the stored records, a current pattern of key events associated with one or more of the first and second executing programs;
   determining, with one or more processing devices, a historical pattern of identified key events associated with previous execution of the first executing program and a historical pattern of identified key events associated with previous execution of the second executing program; and
   comparing, with one or more processing devices, the historical pattern of key events associated with execution of one of the first and second executing programs to the current pattern of key events associated with execution of the corresponding program.

6. The method of claim 1, wherein the program is one of a plurality of programs, wherein each of the programs has a program name;
   wherein one key event is opening a file; and
   the method further comprising logging the opening of a file, wherein logging the opening of the file includes storing, in a file_open data structure associated with the program, the program name of the program and a file name of the file being opened.

7. The method of claim 1, wherein the program is one of a plurality of programs, wherein each of the programs has a program name;
   wherein one key event is closing a file; and
   the method further comprising logging the closing of a file, wherein logging the closing of the file includes storing, in a file_close data structure associated with the program, the program name of the program, the file name of the file being closed, and a total number of read and write operations performed.

8. The method of claim 4, wherein logging further includes:
   determining when a file is opened;
   initializing a new log record for the file; and
   logging an operation associated with the file each time the operation occurs on the file.

9. The method of claim 1, wherein, when the operations associated with the file do not occur within the expected amount of time, logging the operations associated with the file further includes storing the first log record and initializing a second log record for logging further operations associated with the file.

10. The method of claim 9, wherein the delta threshold is selected to produce N log records per unit time, wherein N is an integer greater than 1.

11. A computer program product comprising a computer-readable storage medium having program code embodied therewith, the program code executable by a computing device to:
   log key events that occur during execution of a program, wherein each key event has a corresponding key event type and a corresponding key event data structure associated with the program, wherein logging includes storing records associated with the key events, wherein each record includes the corresponding key event type and is based on the key event data structure associated with the key event;
   analyze the records to determine if a current pattern of key events associated with the program during execution matches an expected pattern of key events for the program; and
   generate a security alert if the current pattern of key events does not match the expected pattern of key events for the program,
   wherein the program code is further executable by the computing device to:
      determine when a file is opened;
      initialize a first log record for logging one or more operations associated with the file; and
      log the operations associated with the file, wherein logging the operations associated with the file includes determining if the operations associated with the file occurred within an expected amount of time, wherein the expected amount of time is a function of a frequency and a delta threshold for the operations within the file.

12. The computer program product of claim 11, wherein the program includes a first executing program and a second executing program, wherein the program code is further executable by the computing device to:
   determine, based on the stored records, a current pattern of key events associated with one or more of the first and second executing programs during execution; and
   determine a historical pattern of identified key events associated with previous execution of each of the first and second executing programs.

13. The computer program product of claim 11, wherein the program code is further executable by the computing device to log recurrent events.

14. A computer system comprising:
   one or more processors, one or more computer-readable memories, and one or more computer-readable storage mediums;
   program instructions, stored on at least one of the one or more storage mediums for execution by at least one of the one or more processors via at least one of the one or more memories, to log an occurrence of one or more key events during execution of a program, wherein each key event has a corresponding key event type and has a corresponding key event data structure associated with the program, wherein logging includes storing records associated with the key events, wherein each record includes the corresponding key event type and is based on the key event data structure associated with the key event;

program instructions, stored on at least one of the one or more storage mediums for execution by at least one of the one or more processors via at least one of the one or more memories, to analyze the records to determine if a current pattern of key events associated with the program during execution matches an expected pattern of key events for the program; and program instructions, stored on at least one of the one or more storage mediums for execution by at least one of the one or more processors via at least one of the one or more memories, to generate a security alert if the current pattern of key events does not match the expected pattern of key events for the program, wherein the program instructions to log occurrence of one or more key events further include program instructions to monitor recurrent events, wherein the program instructions for monitoring recurrent events include:

program instructions to determine when a file is opened;

program instructions to log, in a log record, one or more operations associated with the file, wherein the program instructions to log one or more operations associated with the file include program instructions to determine if the operations associated with the file occurred within an expected amount of time, wherein the expected amount of time is a function of a frequency and a delta threshold for the operations within the file.

15. The computer system of claim 14, wherein the program instructions to log occurrence of one or more key events further include:

program instructions to determine when a file is opened; and program instructions to log, in a log record, an operation associated with the file each time the operation occurs on the file.

16. The computer system of claim 14 wherein the program includes a first executing program and a second executing program, wherein the program instructions to analyze the records include:

program instructions to determine, based on the stored records, a current pattern of key events associated with one or more of the first and second executing programs during execution;

program instructions to determine a historical pattern of identified key events associated with previous execution of each of the first and second executing programs; and program instructions to compare the historical pattern of key events associated with execution of one of the first and second executing programs to the current pattern of key events associated with execution of the corresponding program.

* * * * *

UNITED STATES PATENT AND TRADEMARK OFFICE
CERTIFICATE OF CORRECTION

| | | |
|---|---|---|
| PATENT NO. | : 10,228,988 B2 | Page 1 of 1 |
| APPLICATION NO. | : 14/932467 | |
| DATED | : March 12, 2019 | |
| INVENTOR(S) | : Rachel E. Craik et al. | |

It is certified that error appears in the above-identified patent and that said Letters Patent is hereby corrected as shown below:

On the Title Page

Item (72) Replace "Raymond Mak" with --Ying Chau Raymond Mak--

Signed and Sealed this
Third Day of December, 2019

Andrei Iancu
*Director of the United States Patent and Trademark Office*